United States Patent
Santesson et al.

(10) Patent No.: US 8,374,782 B2
(45) Date of Patent: Feb. 12, 2013

(54) PRE-FETCHING NAVIGATION MAPS

(75) Inventors: Martin Santesson, Malmo (SE); Per Ola Ingvarsson, Hoeoer (SE)

(73) Assignee: Vodafone Group Services Limited, Newbury (GB)

( * ) Notice: Subject to any disclaimer, the term of this patent is extended or adjusted under 35 U.S.C. 154(b) by 782 days.

(21) Appl. No.: 12/219,848

(22) Filed: Jul. 29, 2008

(65) Prior Publication Data

US 2009/0063042 A1    Mar. 5, 2009

Related U.S. Application Data

(60) Provisional application No. 60/968,806, filed on Aug. 29, 2007.

(51) Int. Cl.
*G06F 19/00* (2006.01)
*G01C 21/34* (2006.01)

(52) U.S. Cl. ......... 701/461; 701/451; 701/410; 345/530

(58) Field of Classification Search .................. 701/211, 701/210, 209, 400, 461, 454, 451, 410, 462, 701/463, 464; 340/995.19, 995.13, 905; 345/530, 536, 554

See application file for complete search history.

(56) References Cited

U.S. PATENT DOCUMENTS

| | | | |
|---|---|---|---|
| 7,089,110 | B2 | 8/2006 | Pechatnikov et al. |
| 7,096,117 | B1 | 8/2006 | Gale et al. |
| 7,110,879 | B2 | 9/2006 | Friedrichs et al. |
| 7,599,790 | B2 * | 10/2009 | Rasmussen et al. .......... 701/532 |
| 2001/0029425 | A1 * | 10/2001 | Myr ............................. 701/200 |
| 2002/0177948 | A1 | 11/2002 | Upparapalli et al. |
| 2005/0027448 | A1 * | 2/2005 | Takenaga et al. ............. 701/211 |
| 2005/0033511 | A1 * | 2/2005 | Pechatnikov et al. ......... 701/210 |
| 2005/0270299 | A1 * | 12/2005 | Rasmussen et al. .......... 345/552 |
| 2005/0288859 | A1 | 12/2005 | Golding et al. |
| 2006/0025923 | A1 | 2/2006 | Dotan et al. |
| 2006/0265125 | A1 | 11/2006 | Glaza |
| 2007/0244632 | A1 * | 10/2007 | Mueller et al. ................ 701/202 |
| 2007/0259634 | A1 * | 11/2007 | MacLeod et al. .......... 455/186.1 |

FOREIGN PATENT DOCUMENTS

| | | | |
|---|---|---|---|
| EP | 1 429 263 | A1 | 6/2004 |
| EP | 1 437 571 | A1 | 7/2004 |
| EP | 1 643 214 | A2 | 4/2006 |

* cited by examiner

*Primary Examiner* — Ronnie Mancho
(74) *Attorney, Agent, or Firm* — Birch, Stewart, Kolasch & Birch, LLP

(57) ABSTRACT

A method for providing map tiles associated to a route is described. Generally, a route comprising a number of route segments is received. Then, a respective route segment attribute for each of the route segments is determined. Next, associated map tiles for each of the route segments are determined, using said route segment attributes, and finally an indication of the determined map tiles are transmitted to a map tile fetcher.

27 Claims, 8 Drawing Sheets

PRE-FETCHING NAVIGATION MAPS

TECHNICAL FIELD

The invention generally relates to a method for determining map tiles associated to a route, a method for presenting a route via a graphical user interface, a map tile determinator, a device for presenting a route via a graphical user interface, a navigation system and computer program products.

BACKGROUND OF THE INVENTION

Today, there are several ways of downloading navigation map data for off board clients. The clients usually communicate with a server in order to fetch maps, calculate routes and perform searching.

One way is to use a tile based map system and download the map tiles, as they are needed during navigation as the GPS position is updated. The speed reported by the GPS will be used to select zoom level of the map for the route.

Another common way is to download maps that are custom made for the current route. This means that they are clipped to only contain roads and other geographical features that are in the near vicinity of the actual route.

Although a number of systems for downloading navigation map data have been introduced on the market, the data traffic consumption during download may be improved. Moreover, determining the zoom level from the speed of the GPS will lead to that several levels of possible map details will be downloaded for the same area in case the user stops at a traffic light or similar, which may lead to jerky zooming if the speed varies.

SUMMARY

In view of the above, an objective of the invention is to solve or at least reduce the problems discussed above. In particular, an objective is to provide a method for determining map tiles associated to a route.

Generally, an advantage is that such a method makes it possible to determine the map tiles in advance, which implies that a number of map tiles may be downloaded at the same time, which in turn leads to less data traffic consumption when downloading the map tiles.

Further, the map tiles that are determined in advance may be cached locally in the client and can therefore be reused for other routes, for instance when reversing the route or making another route that covers parts of the already downloaded map tiles.

According to a first aspect, a method for determining map tiles associated to a route is provided. The method comprises receiving the route, wherein the route comprises a number of route segments, determining a respective route segment attribute for each of the route segments, determining associated map tiles for each of the route segments, wherein the associated map tiles depend on the route segment attributes associated to the route segments, and transmitting an indication of the determined associated map tiles to a map tile fetcher.

Each map tile may be identified by a longitude value, a latitude value and a detail level value. This is advantageous in that the determination of the map tiles is performed efficiently.

Each route segment attribute may be associated to a detail level.

Further, each route segment attribute may be associated to a speed limit. This is advantageous in that the zoom level for each map tile may be determined in advance, which leads to a stable zooming during navigation.

For instance, if a route segment covers a road with the speed limit 70 km/h the route segment attribute of this is set accordingly. This means that the zooming level will remain at a predetermined zooming level set for 70 km/h even though a traffic jam arises and the actual speed is decreased.

Further, each route segment attribute may be associated to a road classification, such as highway, city street, gravel road etc.

The map tiles may be determined by using interpolation of simulated GPS positions.

Further, the map tiles may be determined by using linear interpolation.

According to a second aspect a method for presenting a route via a graphical user interface is provided. The method comprises receiving a user input, wherein said user input comprises a start position and an end position, determining a route based upon said user input utilizing a route determinator, wherein said route comprises a number of route segments, determining map tiles corresponding to said route utilizing a map tile determinator, wherein said map tile determinator is configured to determine map tiles corresponding to said route utilizing route segment attributes associated to said number of route segments, transmitting an indication of said determined associated map tiles from said map tile determinator to a map tile fetcher, fetching said determined associated map tiles from at least one memory using said map tile fetcher, and presenting said route via said graphical user interface using said fetched map tiles.

Further, the step of fetching map tiles from at least one memory may comprise determining a first set of said associated map tiles, wherein said first set of associated map tiles may be present in an internal memory, such as a cache memory, and a second set of said associated map tiles, wherein said second set of associated map tiles may be present on a secondary memory, such as an external memory, and fetching said determined first set of said associated map tiles from said internal memory and said determined second set of said associated map tiles from said secondary memory.

An advantage of this is that the data traffic consumption is reduced since the secondary memory may be located on a server.

Moreover, the method may further comprise storing said fetched second set of said associated map tiles in said internal memory.

An advantage of this method is that the map tiles associated to an input route may be downloaded in advance, which means that a more efficient memory handling is achieved.

Further, the route determinator may be placed on a remote server.

Moreover, the secondary memory may be placed on a remote server.

According to a third aspect, a map tile determinator configured to determine map tiles associated to a route, wherein the route comprises route segments, is provided. The map tile determinator comprises a receiver configured to receive the route, a route segment attribute determinator configured to determine a respective route segment attribute for each of the route segments, a determinator configured to determine associated map tiles for each of the route segments, wherein the associated map tiles depend on the route segment attributes associated to the route segments, and a transmitter configured to transmit an indication of the associated map tiles to a map tile fetcher.

Each route segment attribute may be associated to a detail level.

Further, each route segment attribute may be associated to a speed limit.

Moreover, each route segment attribute may be associated to a road classification.

Additionally, the map tiles may be determined by using interpolation of simulated GPS positions.

Further, the map tiles may be determined by using linear interpolation.

According to a fourth aspect, a device for presenting a route via a graphical user interface is provided. The device may comprise a receiver configured to receive a user input, wherein the user input comprises a start position and an end position, a transmitter configured to transmit the user input to a route determinator configured to determine a route based upon the user input, wherein the route comprises a number of route segments, a receiver configured to receive the determined route from the route determinator, a map tile determinator configured to determine map tiles associated to the route, wherein the map tile determinator may be configured to determine map tiles associated to the route segments utilizing route segment attributes associated to the route segments, a map tile fetcher configured to fetch said determined associated map tiles from at least one memory, and a GUI handler configured to present the route using the map tiles.

The map tile fetcher may be configured to determine a first set of said associated map tiles, wherein said first set of associated map tiles are pre-sent in an internal memory, such as a cache memory, and a second set of said associated map tiles, wherein said second set of associated map tiles are present on a secondary memory, such as an external memory, and to fetch said determined first set of said associated map tiles from said internal memory and said determined second set of said associated map tiles from said secondary memory.

Further, the map tile fetcher may be configured to store said fetched second set of said associated map tiles in said internal memory.

Moreover, the route determinator may be placed on a remote server.

Additionally, the map tile determinator may be comprised within the device.

The device may be a mobile terminal.

Further, the secondary memory may be placed on a remote server.

According to a fifth aspect, a navigation system comprising a communications network is provided. The system may comprise a device connected to the communications network, and a route determinator connected to the communications network.

The system may further comprise a memory connected to the communications network.

According to a sixth aspect, a computer program product is provided. The computer program product may comprise software instructions that, when executed in an apparatus, such as a mobile terminal, performs the method for determining map tiles associated to a route.

According to a seventh aspect, a computer program product is provided. The computer program product comprises software instructions that, when executed in an apparatus, such as a mobile terminal, performs the method for presenting a route via a graphical user interface.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, wherein.

DETAILED DESCRIPTION OF PREFERRED EMBODIMENTS

Figure 1:
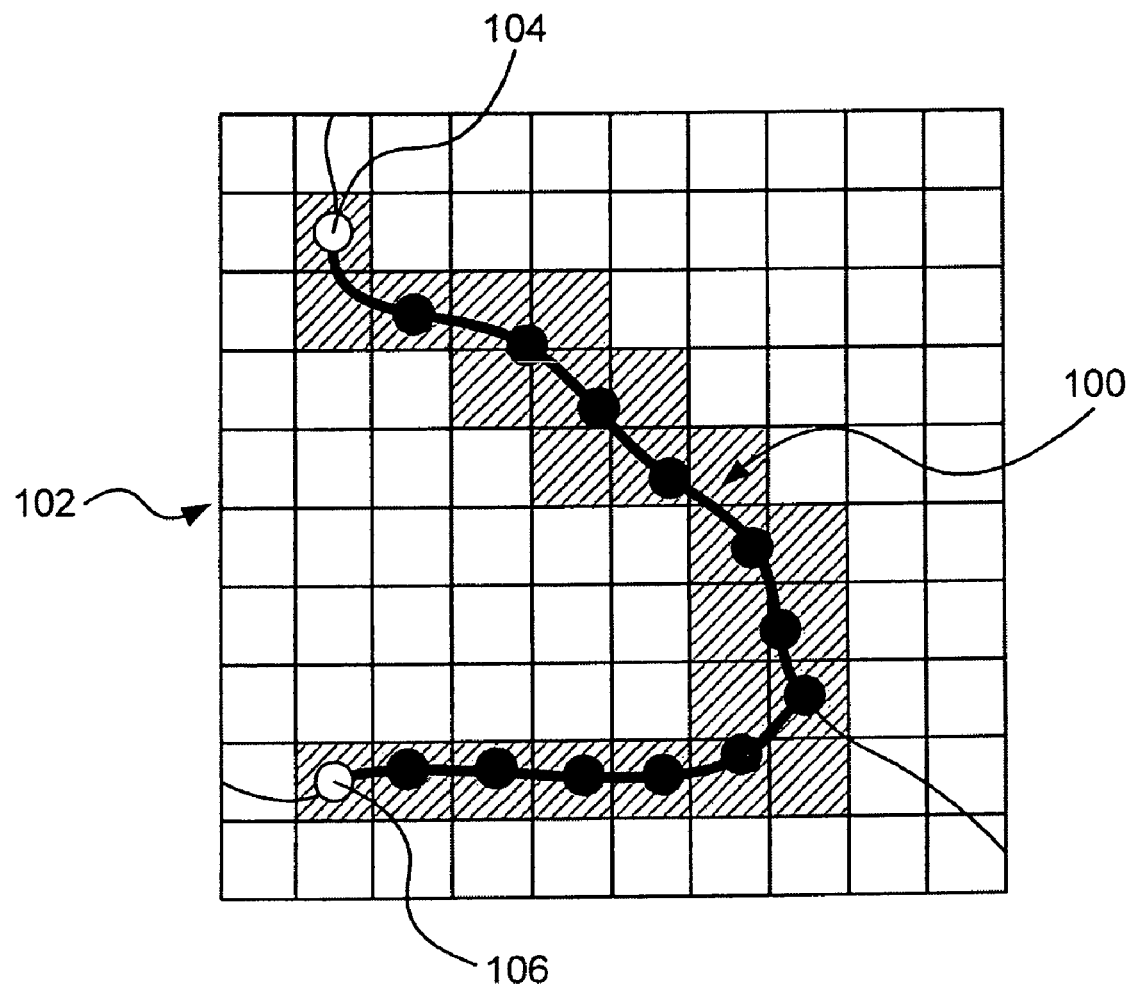
FIG. 1. is a schematic illustration of a route presented via a graphical user interface on a display.

FIG. 1 is a schematic illustration of a route 100 presented via a graphical user interface 102, e.g. a display. The route is defined on the map between a start position 104 and an end position 106 and consists of route segments, which may be associated to a detail level or a speed limit. A map tile determinator determines which map tiles that correspond to the route, illustrated with shadowed map tiles in FIG. 1. The size of the map tiles may depend on set detail level.

The map may have different map layers showing different kind of information, which can be independent of each other and can be turned on or off during navigation. Possible map layers may be "map" data, which is the basic map data showing water areas, land areas, roads, parks, etc. Other map layers may be "Point of interests" i.e. icons for restaurants, hotels, gas stations, tourist attractions, etc. Further, "routes" may be of interest, which includes the geometry of the route. An additional map layer can be "traffic" showing icons for speed cameras and traffic jams.

Figure 2A:
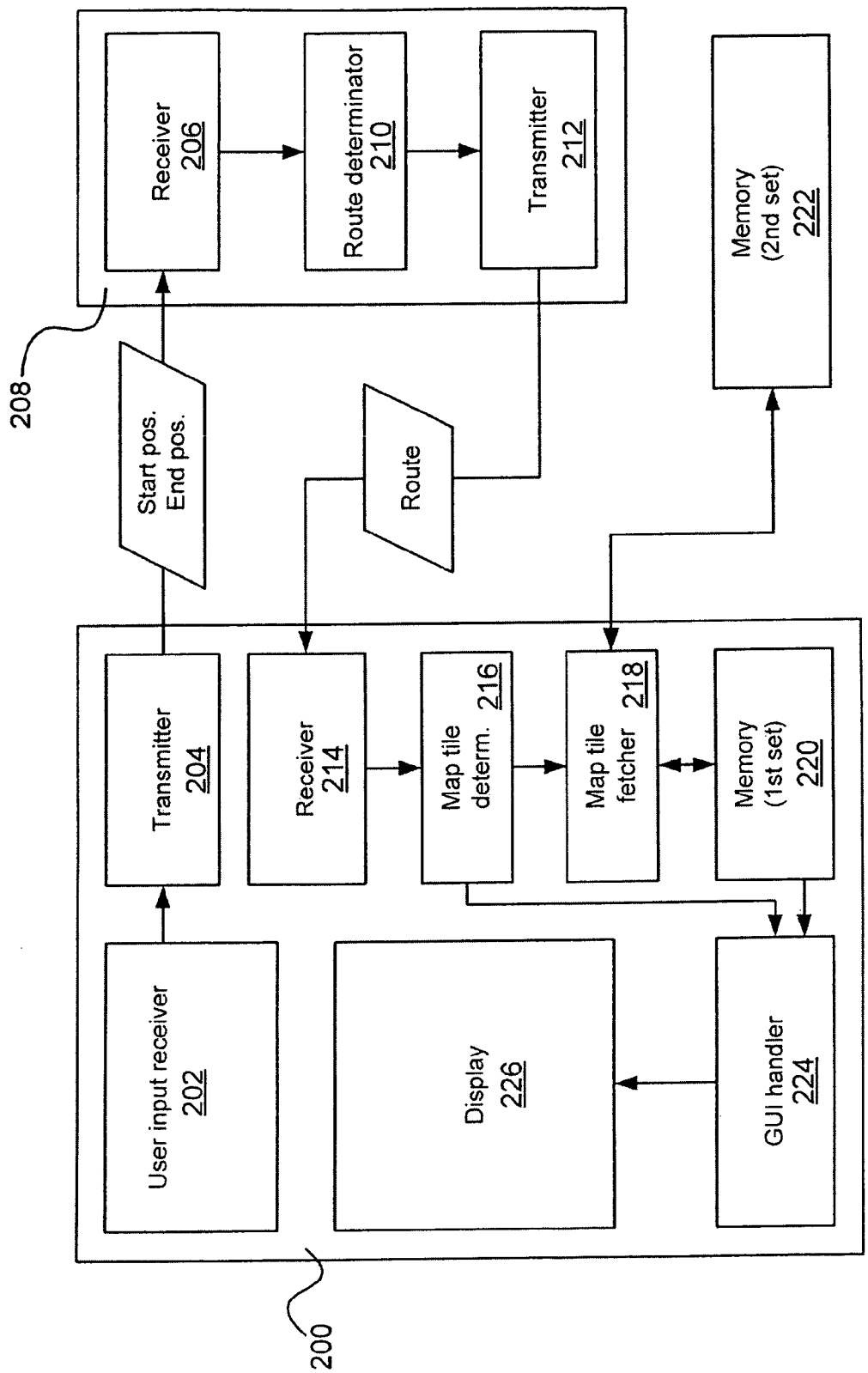
FIG. 2A is a schematic illustration of an embodiment of a device for presenting a route via a graphical user interface.

FIG. 2A is a schematic illustration of a device 200 for presenting a route via a graphical user interface. The device, which may be a client device, comprises a user input receiver 202 that is configured to receive a user input comprising a start position and an end position of the route. The start and end position can be transmitted via a transmitter 204 to a receiver 206 that can be located at a server 208. The receiver can be configured to send the start and end position to a route determinator 210 where the route can be determined. Via a transmitter 212 the route can be sent to a receiver 214 that can be placed in said device 200. The received route can thereafter be sent to a map tile determinator 216 where the map tiles for the route is determined. The map tile determinator 216 can be placed locally at a device, as illustrated in FIG. 2A, or on a remote server.

In order to distinguish between different map tiles, each map tile may be identified by a longitude value, a latitude value and a detail level value.

When the map tiles associated to the route is determined, this information can be provided to a map tile fetcher 218. The map tile fetcher can provide that the associated map tiles are available in an internal memory 220, such as a cache memory. This can be achieved by determining which of the associated map tiles that are present in the memory 220, referred to as a first set of map tiles, and then downloading the associated map tiles that are not present in the memory 220, referred to as a second set of map tiles, from a secondary memory 222, such as an external memory. In order to further improve the handling of the map tiles several internal memories may be utilized. For instance, the device may comprise a cache memory and a RAM (Random Access Memory). Moreover, pre-installed map tiles may be stored in yet another internal memory, such as a ROM (Read Only Memory). The pre-installed map tiles may be downloaded from a server by the user of the device.

A graphical user interface (GUI) handler 224 can be configured to present map tiles on a display 226. The map tiles may be presented as soon as they are received by the GUI handler 224, referred to a streaming presentation of map tiles.

During navigation, position data is provided to the map tile determinator 216. Based on this position data, the map tile determinator 216 can determine which map tiles that are to be shown and provide this information to the GUI handler 224, which in turn provides that these map tiles are shown on the display 226. By using the same map tile determinator 216 for determining map tiles in advance and for determining map tiles during navigation, the map tiles will be determined in the same way, which implies that the map tiles determined in advance may be utilized in an efficient way.

Figure 2B:
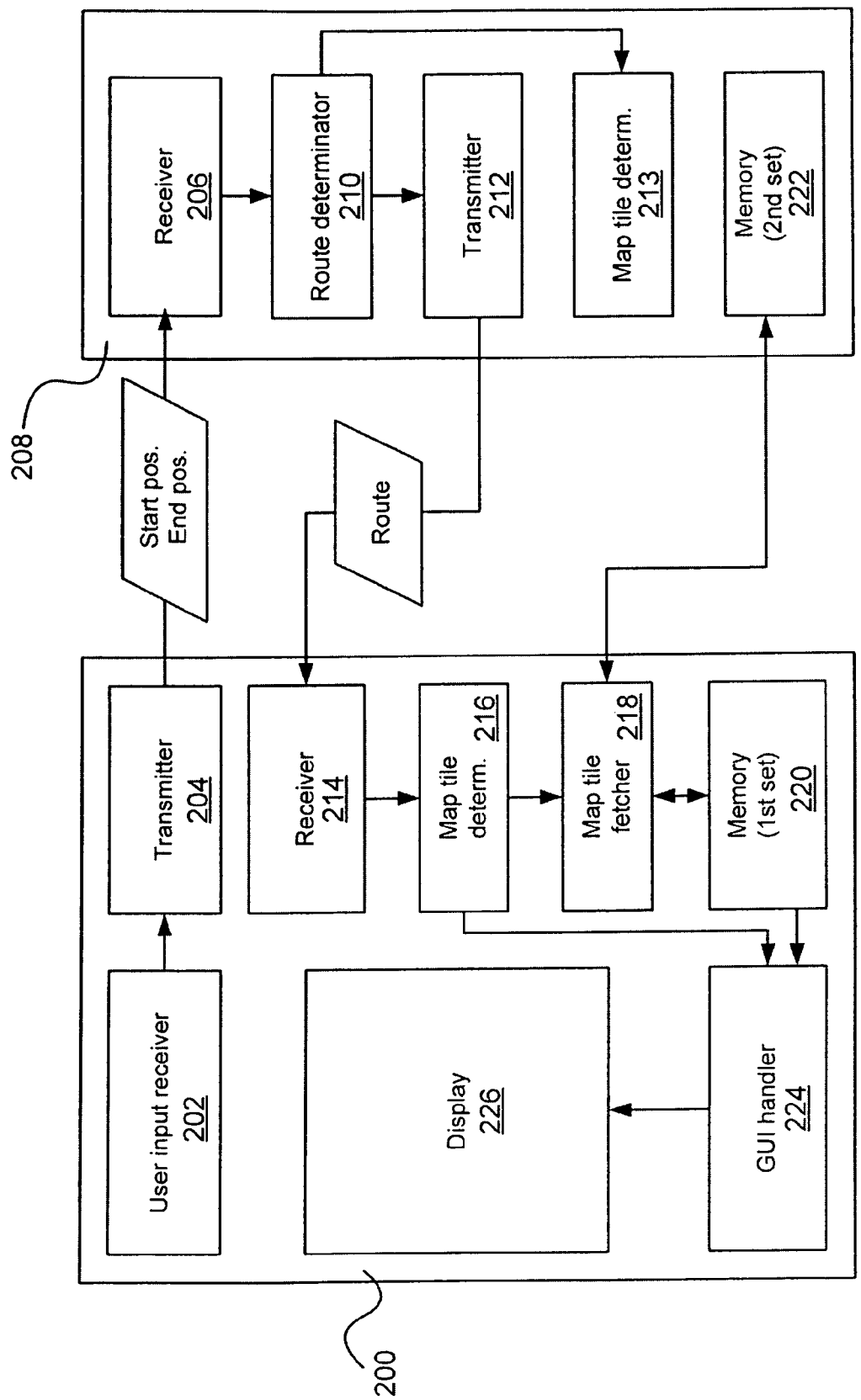
FIG. 2B is a schematic illustration of another embodiment of a device for presenting a route via a graphical user interface.

Alternatively, as illustrated in FIG. 2B, a map tile determinator 213 may be present at the server 208 as well. An advantage of this is that the server 208 can prepare the map tiles in advance such that when the device 200 requests map tiles, these are prepared to be transmitted from the server 208 to the device 200. This can be preferable if a large number of map tiles is to be downloaded.

Figure 3:
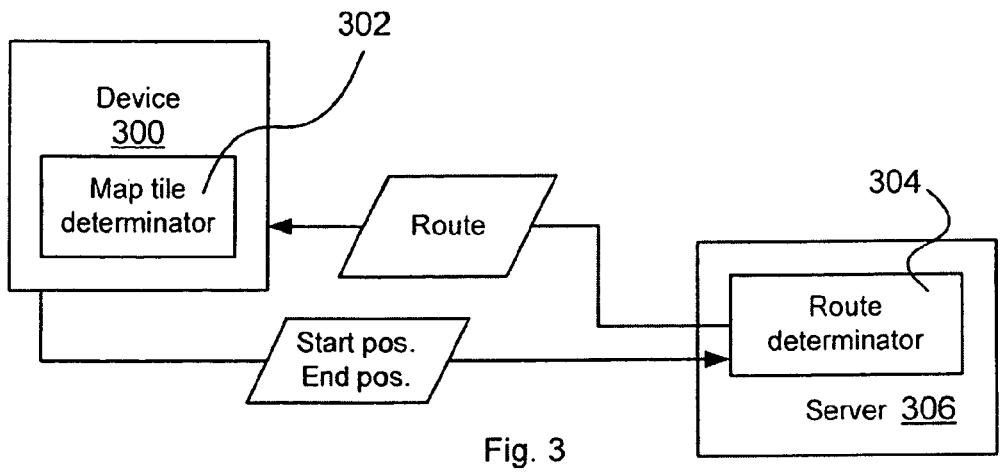
FIG. 3 is a diagrammatic illustration of an embodiment where the map tile determinator is located at the device and the route determinator is located at the server.

FIG. 3 is a diagrammatic illustration of an embodiment where a map tile determinator 302 is located at a device 300 and a route determinator 304 is located at a server 306. As illustrated, a start and end position can be sent from the device 300 to the server 306. Based on the start and end position the route determinator 304 can determine a route and transmit this back to the device 300.

Figure 4:
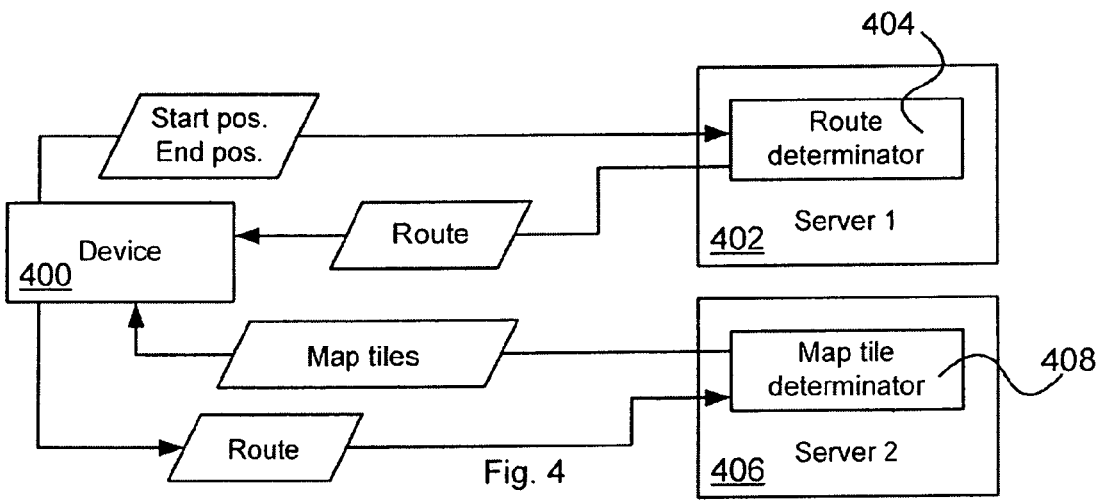
FIG. 4 is a diagrammatic illustration of an embodiment where the route determinator and map tile determinator are located on separate servers.

FIG. 4 is a diagrammatic illustration of an embodiment where a device 400 is in communication with two servers, referred to as server 1 402 and server 2 406. A route determinator 404 can be located on the server 1 and a map tile determinator 408 can be located on the server 2.

Figure 5:
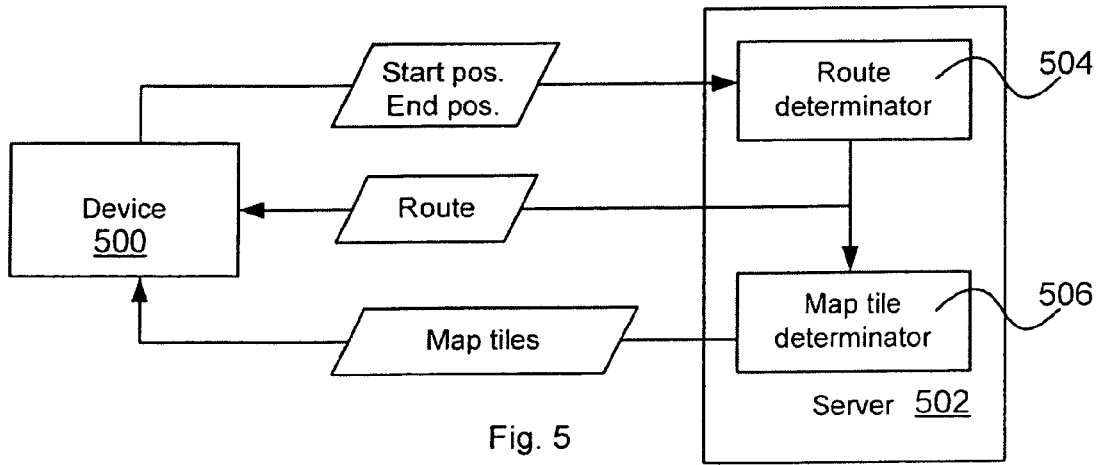
FIG. 5 is a diagrammatic illustration of an embodiment where the route determinator and map tile determinator are located on the same server.

FIG. 5 is a diagrammatic illustration of yet another alternative embodiment where the device 500 is in communication with one server 502 where a route determinator 504 and a map tile determinator 506 are located. From the device a start and end position are sent to the route determinator 504 where the route is determined. The route is then sent to the device 500 and to the map tile determinator 506 where the map tiles are determined and sent to the device.

Figure 6:
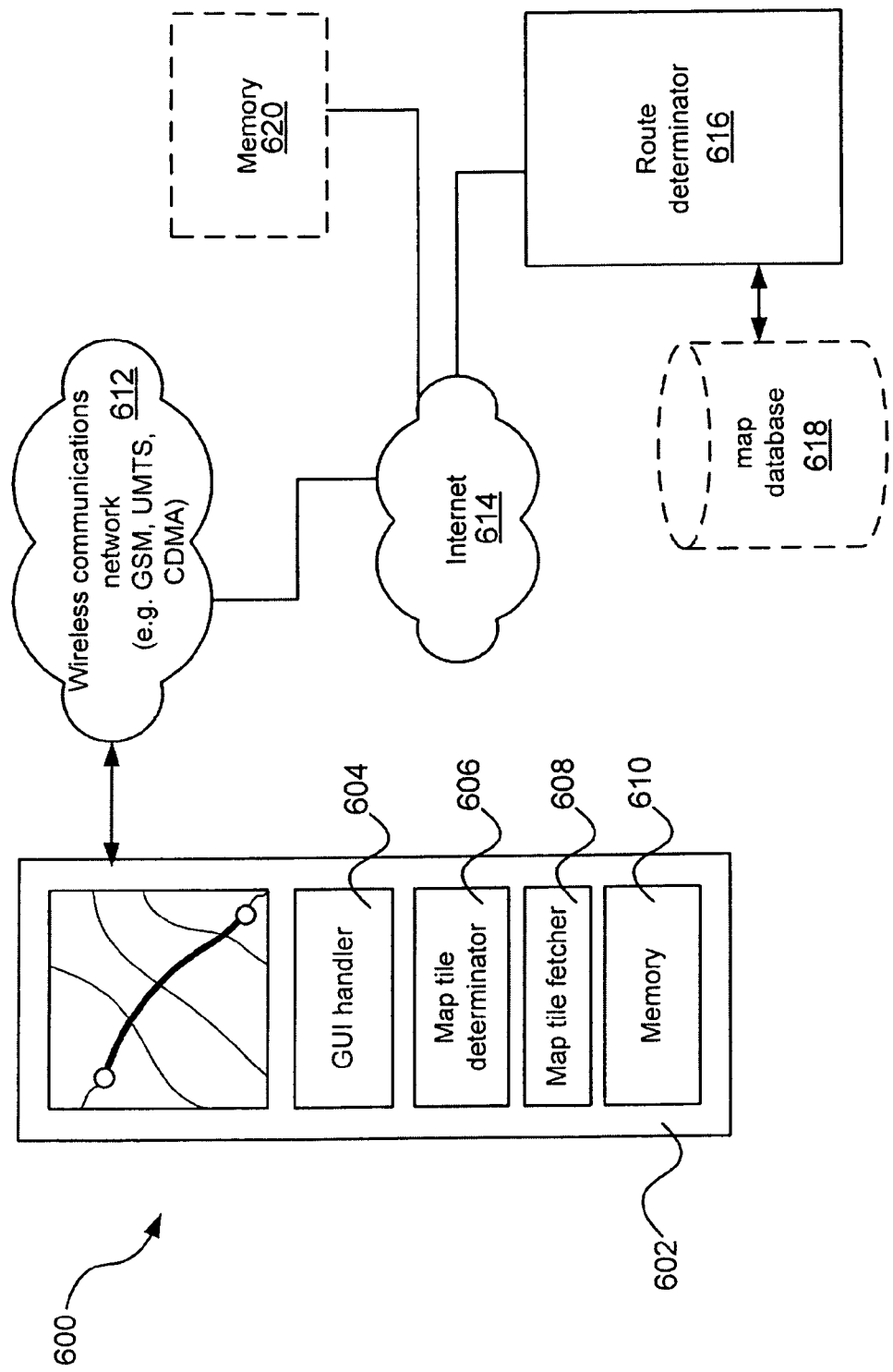
FIG. 6 is a schematic illustration of a navigation system.

FIG. 6 is a schematic illustration of a navigation system 600. The system comprises a device 602 for presenting a route via a graphical user interface (GUI) comprising a GUI handler 604, a map tile determinator 606, a map tile fetcher 608 and a memory 610. Further, the navigation system can comprise a wireless communications network 612, such as a GSM, UMTS, CDMA or other any other standard suitable for wireless data transmission, Internet 614, or other network for data communication, a route determinator 616, a map database 618, and a memory 620.

The device 602 can be connected to the wireless communications network 612, which in turn can be connected to the Internet 614, which in turn can be connected to the route determinator 616. This route determinator may be placed on a server. In order to determine the route the database 618 may be utilized. The map database 618 may be located within the same server as the route determinator is located or externally located as illustrated in FIG. 6. Also the map tile data may be stored externally in an external memory 620 or locally within the route determinator 616.

Figure 7:
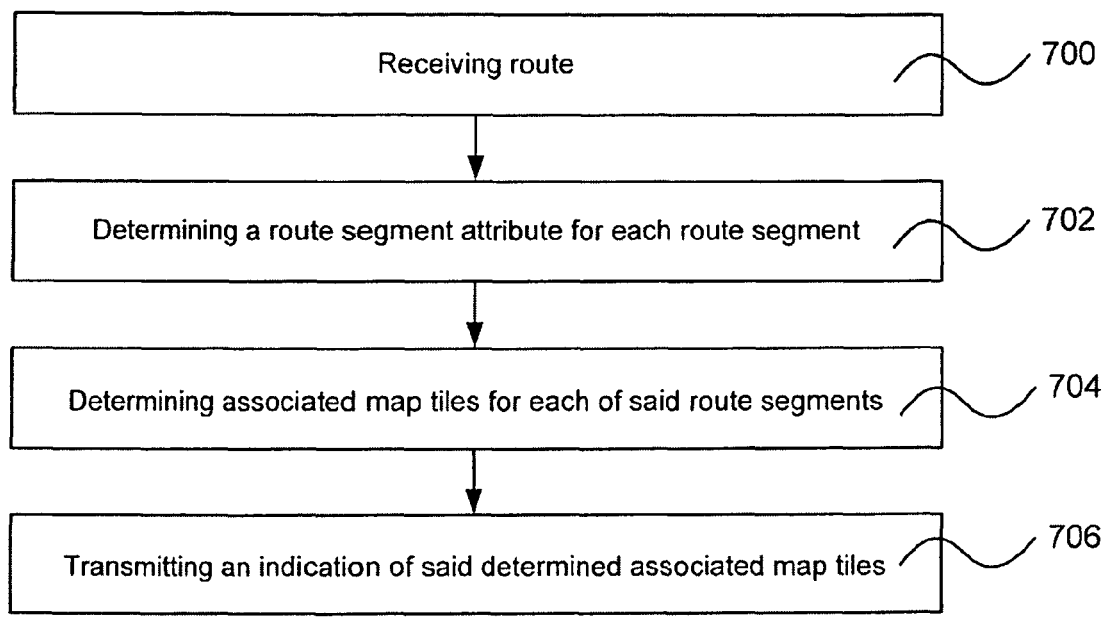
FIG. 7 is a flow chart illustrating a method for determining map tiles associated to a route.

FIG. 7 is a flow chart illustrating a method for determining map tiles associated to a route.

In a step 700 a route may be received, wherein the route comprises a number of route segments.

In a step 702 a respective route segment attribute for each of the route segments can be determined.

In a step 704 associated map tiles for each of the route segments can be determined.

In a step 706 the determined associated map tiles can be transmitted to a map tile fetcher.

Figure 8:
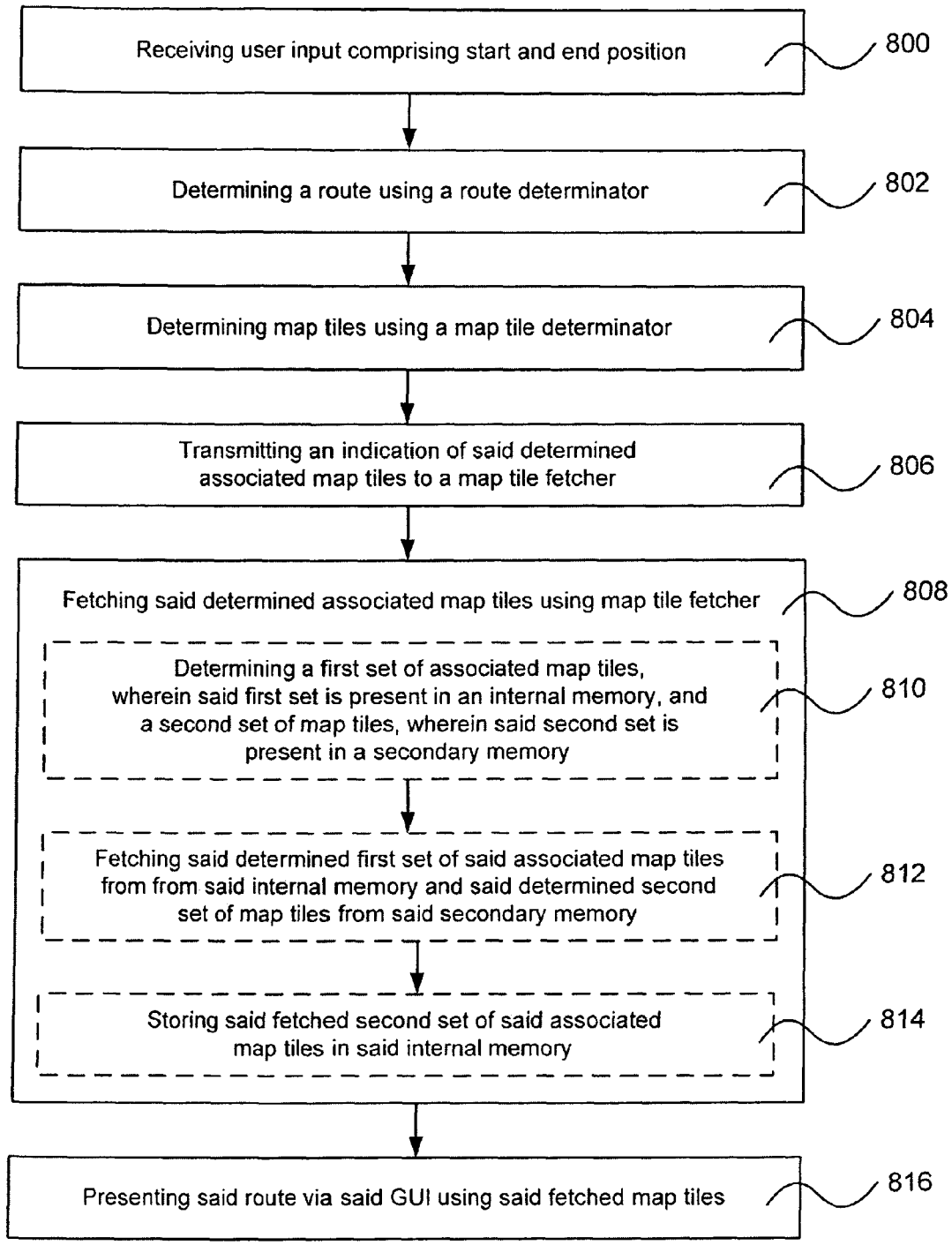
FIG. 8 is a flow chart illustrating a method for presenting a route via a graphical user interface (GUI)

FIG. 8 is a flow chart illustrating a method for presenting a route via a graphical user interface.

In a step 800, a user input comprising a start and end position can be received.

In a step 802, a route can be determined by utilizing a route determinator.

In a step 804, the map tiles associated to the route can be determined utilizing a map tile determinator.

In a step 806, an indication of said determined associated map tiles can be transmitted from said map tile determinator to a map tile fetcher.

In a step 808, said determined associated map tiles can be fetched using said map tile fetcher. This step may comprise a sub-step 810 in which a first set of associated map tiles, wherein the first set is present in an internal memory, and a second set of map tiles, wherein said second set is present in a secondary memory, are determined. Further, a sub-step 812 may comprise fetching said determined first set from said internal memory and said determined second set of map tiles from said secondary memory. In an optional step 814, the fetched second set of said associated map tiles can be stored in said internal memory.

In a step 816 said route can be presented via the graphical user interface using the fetched map tiles.

Figure 9:
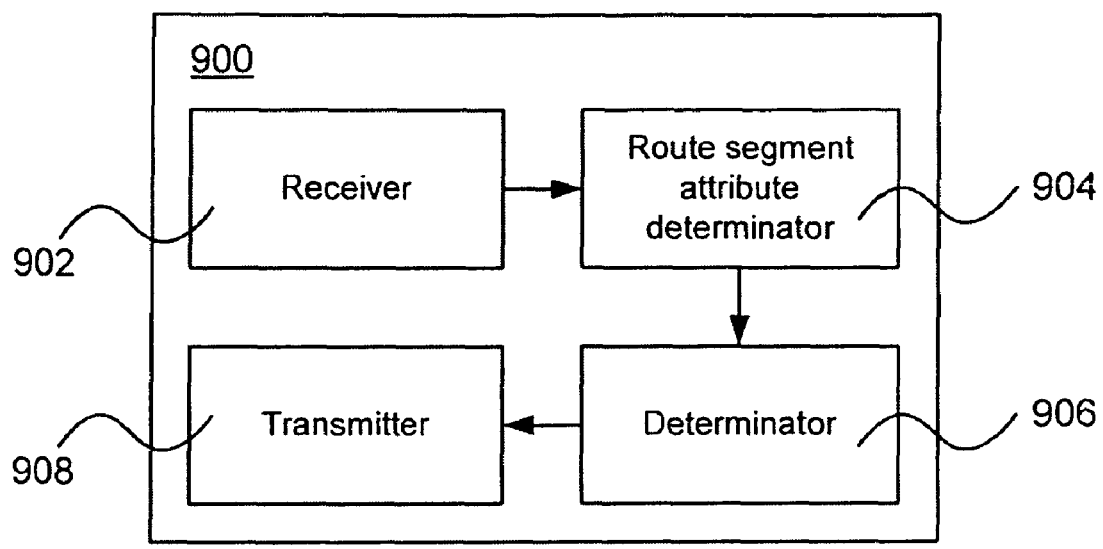
FIG. 9 is a schematic illustration of a map tile determinator.

FIG. 9 illustrates a map tile determinator 900 in further detail. The map tile determinator 900 can comprise a receiver 902, a route segment attribute determinator 904, a determinator 906 and a transmitter 908. The receiver 902 can be configured to receive a route from e.g. a route determinator. The route segment attribute determinator 904 can be configured to determine attributes for route segments of said received route. The determinator 906 can be configured to determine map tiles associated to the determined route segments. Finally, the transmitter 908 can be configured to transmit an indication of the determined associated map tiles to a map tile fetcher, which in turn may be configured to fetch the associated map tiles.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:
1. A method for determining map tiles associated with a route to display a map using the determined map tiles, said method comprising
receiving said route, wherein said route comprises a number of route segments, using a receiver, determining associated map tiles for each of said route segments, using a map tile determinator, wherein said associated map tiles depend on route segment attributes comprising a speed limit associated with each of said route segments, and transmitting an indication of said determined associated map tiles to a map tile fetcher, using a transmitter.

2. The method according to claim 1, wherein each map tile is identified by a longitude value, a latitude value and a detail level value.

3. The method according to claim 1, wherein each route segment attribute is associated with a detail level.

4. The method according to claim 1, wherein each route segment attribute is associated with a road classification.

5. The method according to claim 1, wherein said map tiles are determined by using linear interpolation.

6. A method for presenting a route via a graphical user interface, said method comprising receiving a user input, wherein said user input comprises a start position and an end position, determining a route based upon said user input utilizing a route determinator, wherein said route comprises a number of route segments, determining map tiles associated to said route utilizing a map tile determinator, wherein said map tile determinator is configured to determine map tiles corresponding to said route utilizing route segment attributes comprising a speed limit associated with said number of route segments, transmitting an indication of said determined associated map tiles from said map tile determinator to a map tile fetcher, fetching said determined associated map tiles from at least one memory using said map tile fetcher, and presenting said route via said graphical user interface using said fetched map tiles.

7. The method according to claim 6, wherein said step of fetching map tiles from at least one memory comprises determining a first set of said associated map tiles, wherein said first set of associated map tiles are present in an internal memory, such as a cache memory, and a second set of said associated map tiles, wherein said second set of associated map tiles are present on a secondary memory, such as an external memory, and fetching said determined first set of said associated map tiles from said internal memory and said determined second set of said associated map tiles from said secondary memory.

8. The method according to claim 7, further comprising storing said fetched second set of said associated map tiles in said internal memory.

9. The method according to claim 6, wherein said route determinator is placed on a remote server.

10. The method according to claim 7, wherein said secondary memory is placed on a remote server.

11. A map tile determinator configured to determine map tiles associated to a route, wherein said route comprises route segments, said map tile determinator comprises a receiver configured to receive said route, a route segment attribute determinator configured to determine a respective route segment attribute for each of said route segments, a determinator configured to determine associated map tiles for each of said route segments, wherein said associated map tiles depend on said route segment attributes comprising a speed limit associated with said route segments, and a transmitter configured to transmit an indication of said determined associated map tiles to a map tile fetcher.

12. The map tile determinator according to claim 11, wherein each route segment attribute is associated with a detail level.

13. The map tile determinator according to claim 11, wherein each route segment attribute is associated with a speed limit.

14. The map tile determinator according to claim 11, wherein each route segment attribute is associated with a road classification.

15. The map tile determinator according to claim 11, wherein said map tiles are determined by using interpolation of simulated GPS positions.

16. The map tile determinator according to claim 11, wherein said map tiles are determined by using linear interpolation.

17. A device for presenting a route via a graphical user interface, said device comprising a receiver configured to receive a user input, wherein said user input comprises a start position and an end position, a transmitter configured to transmit said user input to a route determinator configured to determine a route based upon said user input, wherein said route comprises a number of route segments, a receiver configured to receive said determined route from said route determinator, a map tile determinator configured to determine map tiles associated to said route, wherein said map tile determinator is configured to determine map tiles associated to said route segments utilizing route segment attributes comprising a speed limit associated with said route segments, a map tile fetcher configured to fetch said determined associated map tiles from at least one memory, and a GUI handler configured to present said route using said map tiles.

18. The device according to claim 17, wherein said map tile fetcher is configured to determine a first set of said associated map tiles, wherein said first set of associated map tiles are present in an internal memory located internally to said device, such as a cache memory, and a second set of said associated map tiles, wherein said second set of associated map tiles are present on a secondary memory, such as an external memory located externally to said device, and to fetch said determined first set of said associated map tiles from said internal memory and said determined second set of said associated map tiles from said secondary memory.

19. The device according to claim 18, wherein said map tile fetcher is further configured to store said fetched second set of said associated map tiles in said internal memory.

20. The device according to claim 17, wherein said route determinator is placed on a remote server.

21. The device according to claim 17, wherein said map tile determinator is comprised within said device.

22. The device according to claim 17, wherein said device is a mobile terminal.

23. The device according to claim 18, wherein said secondary memory is placed on a remote server.

24. A navigation system comprising a communications network, a device according to claim 17 connected to said communications network, and a route determinator connected to said communications network.

25. The navigation system according to claim 24, further comprising a memory connected to said communications network.

26. A computer program product stored in a computer readable medium comprising software instructions that, when executed in an apparatus, such as a mobile terminal, performs the method according to any of the claims 1 to 3, 4 and 5.

27. A computer program product stored in a computer readable medium comprising software instructions that, when executed in an apparatus, such as a mobile terminal, performs the method according to any of the claims 6 to 10.

* * * * *